(12) United States Patent
Tenkap Mfoubi et al.

(10) Patent No.: US 12,083,976 B2
(45) Date of Patent: Sep. 10, 2024

(54) SIDE AIRBAG DEVICE FOR A MOTOR VEHICLE, AND METHOD FOR OPERATING A SIDE AIRBAG DEVICE

(71) Applicant: MERCEDES-BENZ GROUP AG, Stuttgart (DE)

(72) Inventors: Olivier Frank Tenkap Mfoubi, Aidlingen (DE); Jan Rieder, Böblingen (DE); Matthias Walz, Kirchentellinsfurt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/020,664

(22) PCT Filed: Jul. 27, 2021

(86) PCT No.: PCT/EP2021/071005
§ 371 (c)(1),
(2) Date: Feb. 10, 2023

(87) PCT Pub. No.: WO2022/033866
PCT Pub. Date: Feb. 17, 2022

(65) Prior Publication Data
US 2023/0303020 A1  Sep. 28, 2023

(30) Foreign Application Priority Data
Aug. 13, 2020  (DE) .................... 10 2020 004 920.6

(51) Int. Cl.
*B60R 21/013* (2006.01)
*B60R 21/015* (2006.01)
(Continued)

(52) U.S. Cl.
CPC ...... *B60R 21/013* (2013.01); *B60R 21/01512* (2014.10); *B60R 21/23138* (2013.01); *B60R 21/239* (2013.01); *B60R 2021/2395* (2013.01)

(58) Field of Classification Search
CPC ............ B60R 21/013; B60R 21/01512; B60R 21/01508; B60R 21/23138; B60R 2021/2395; B60R 21/239
See application file for complete search history.

(56) References Cited

U.S. PATENT DOCUMENTS 6,241,279 B1 * 6/2001 Ochiai .............. B60R 21/01508
280/739
7,819,421 B2  10/2010 Naito et al.
(Continued)

FOREIGN PATENT DOCUMENTS

DE  102008014036 A1  10/2008
DE  102009016606 A1  10/2010
(Continued)

OTHER PUBLICATIONS

International Search Report and Written Opinion mailed Nov. 10, 2021 in related/corresponding International Application No. PCT/EP2021/071005.
(Continued)

*Primary Examiner* — Amy R Weisberg
*Assistant Examiner* — Matthew D Lee
(74) *Attorney, Agent, or Firm* — PATENT PORTFOLIO BUILDERS PLLC

(57) ABSTRACT

A side airbag device for a motor vehicle includes an airbag, in which, in the event of an impact, gas is introduced by a gas generator of the side airbag device. The airbag includes drain valve for removing the gas immediately after the impact. The device also includes an electronic computing unit and a further drain valve and/or a further gas generator.

(Continued)

A passenger of the motor vehicle is detected by a detection unit. The device is filled with the gas in the event of the impact to protect this passenger. The electronic computing unit is configured, depending on the detected passenger, to determine a gas pressure in the airbag by actuation of the further drain valve or the further gas generator before the impact and to adapt the gas pressure to the passengers during the impact.

8 Claims, 1 Drawing Sheet

(51) Int. Cl.
*B60R 21/231* (2011.01)
*B60R 21/239* (2006.01)

(56) References Cited

U.S. PATENT DOCUMENTS

| | | | |
|---|---|---|---|
| 8,474,862 | B2 | 7/2013 | Pursche et al. |
| 10,518,738 | B2 | 12/2019 | Kobayashi et al. |
| 10,981,533 | B2 | 4/2021 | Kobayashi et al. |
| 2006/0192367 | A1* | 8/2006 | Zumpano ............. B60R 21/232 280/730.1 |
| 2007/0251749 | A1* | 11/2007 | Breed ................... G01S 15/88 177/144 |
| 2008/0231026 | A1* | 9/2008 | Naito ................ B60R 21/23138 280/730.2 |
| 2017/0036641 | A1* | 2/2017 | Ohno .................... B60R 21/207 |
| 2018/0086302 | A1 | 3/2018 | Hiraiwa et al. |
| 2019/0375364 | A1* | 12/2019 | Tanaka ................... B60R 22/46 |

FOREIGN PATENT DOCUMENTS

| | | |
|---|---|---|
| DE | 102015005482 A1 | 3/2016 |
| EP | 3459796 A1 | 3/2019 |
| JP | 2010521351 A | 6/2010 |
| JP | 2017094913 A | 6/2017 |
| JP | 2018012466 A | 1/2018 |
| JP | 2018052158 A | 4/2018 |
| WO | WO-2008113684 A1 * 9/2008 ......... B60R 21/0134 |
| WO | 2017057073 A1 | 4/2017 |
| WO | 2017199850 A1 | 11/2017 |

OTHER PUBLICATIONS

Notice of Reasons for Refusal dated Jan. 24, 2024 in related/corresponding JP Application No. 2023-507875.

* cited by examiner

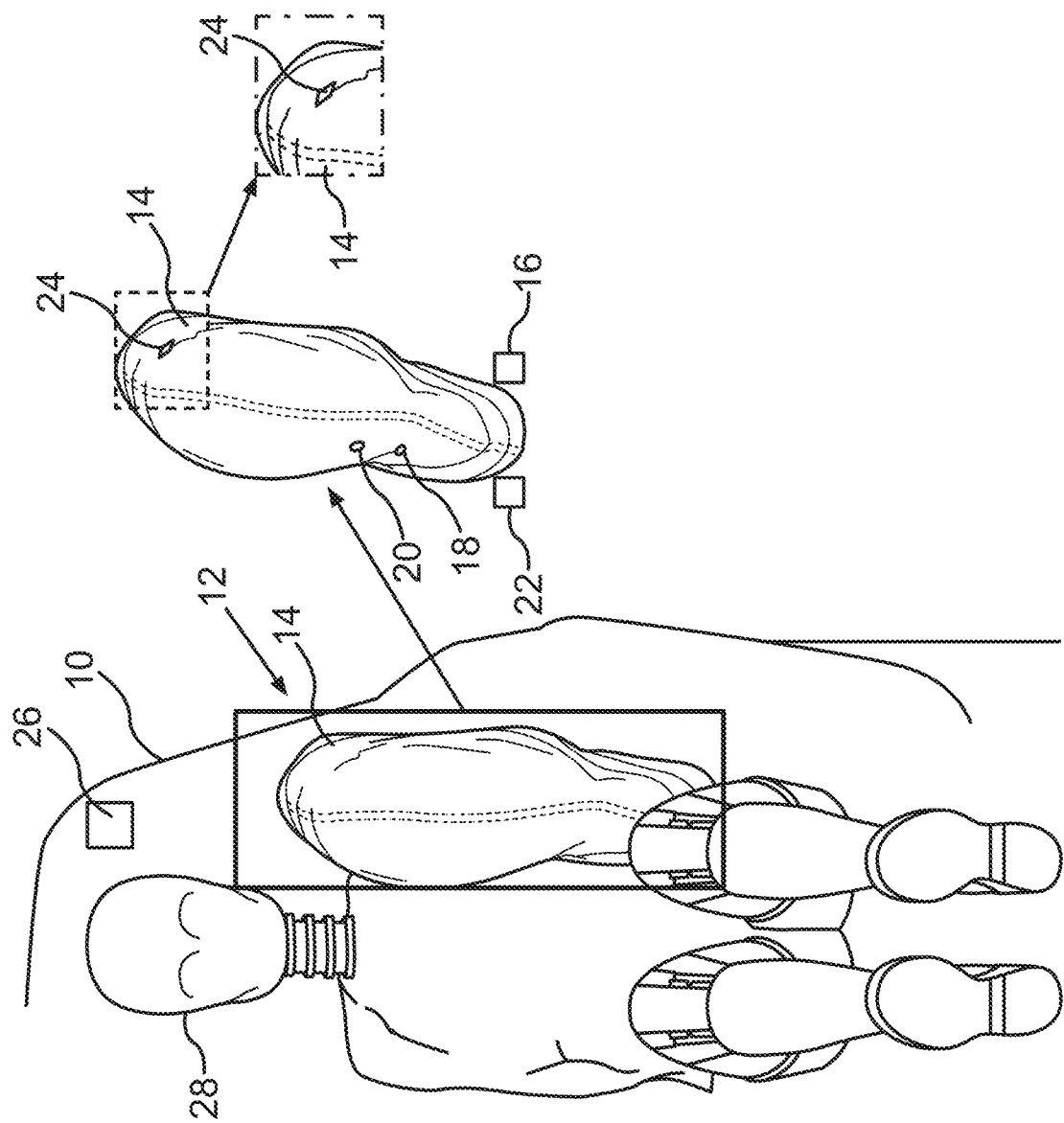

SIDE AIRBAG DEVICE FOR A MOTOR VEHICLE, AND METHOD FOR OPERATING A SIDE AIRBAG DEVICE

BACKGROUND AND SUMMARY OF THE INVENTION

Exemplary embodiments of the invention relate to a side airbag device for a motor vehicle comprising at least one airbag, as well as to a method for operating a side airbag device.

Side airbag devices, which may also be referred to simply as side airbags, are already known from the prior art. They are arranged, for example, in a corresponding seat of a motor vehicle and can be filled with a gas in the event of an impact so that a passenger is protected in the event of a side impact of the motor vehicle. It is also known that different passengers, for example adults and children, may be inside the motor vehicle, and different requirements are then placed on the side airbag.

Document DE 10 2009 016 606 A1 relates to a vehicle seat for a motor vehicle comprising a backrest, on which there is arranged a side airbag having a first side wall pointing towards the passenger and a second side wall pointing towards the vehicle outer side, the side airbag being arranged on the side of the backrest that points towards the outer side of the motor vehicle, and the side airbag having, on one of the two side walls, a first ventilation opening, which is at least restricted when an object is rested against said opening. To adapt the internal pressure of the airbag to the weight of the vehicle passenger, the vehicle seat is height-adjustable, and the first ventilation opening is arranged in the second side wall.

DE 10 2015 005 482 A1 discloses an airbag having an adaptive ventilation device. The airbag casing of the airbag has at least one ventilation opening. Furthermore, a pull element associated with a ventilation opening and a cover element arranged outside the airbag casing and associated with the ventilation opening are provided, a first end of the pull element being permanently connected to the airbag casing or detachably or separably connected to a holding element, and a second end of the pull element being permanently connected to the cover element, and the cover element restricting the ventilation opening more strongly when the pull element is tensioned than then the pull element is not tensioned. To improve the reproducibility of the behavior of the airbag, the cover element is connected to the airbag casing around the ventilation opening and by means of a connection, such that the geometric area of the airbag casing that is surrounded by the connection has a second surface area that is greater than the first surface area. The cover element also has at least one through-flow opening.

Exemplary embodiments of the present invention are directed to a side airbag device and a method by means of which a gas pressure in the airbag can be adapted in an improved manner.

One aspect of the invention relates to a side airbag device for a motor vehicle comprising at least one airbag, in which, in the event of an impact, a gas is introduced by means of a gas generator of the side airbag device, and comprising a drain valve for removing the gas immediately after the impact.

It is provided that the side airbag device comprises an electronic computing unit and a further drain valve and/or a further gas generator, a passenger of the motor vehicle being detected by means of a detection unit of the side airbag device, the side airbag device being filled with the gas in the event of the impact in order to protect this passenger, and the electronic computing unit being configured, depending on the detected person, to determine a gas pressure in the airbag by actuation of the further drain valve and/or the further gas generator temporally before the impact and to adapt the gas pressure to the passengers during an impact.

In particular, an adaptive outlet opening is thus provided on the side airbag, in particular on the side airbag device, and is activated depending on the passenger or seat occupation, so that it is possible to control the pressure within the side airbag device during an impact, in particular a side impact. For example, if the passenger is a child, the further drain valve can be activated, for example, with the aid of an igniter. If, by contrast, the passenger is an adult, the further drain valve remains closed.

In the embodiment of the gas generator, a further gas generator or a two-stage gas generator can be proposed, for example. In the first stage of the gas generator the deployment and positioning of the side airbag device would be performed independently of the presence of the passenger. The second stage is then to be ignited depending on the passenger. If, for example, the passenger is a child, the ignition of the second gas generator or two-stage gas generator remains off, whereas, in the case of an adult, the second stage can be ignited.

The side airbag device according to the invention with the adaptive outlet opening or the further outlet valve is thus improved for all passengers, in particular for universal use.

In accordance with an advantageous embodiment the electronic computing unit is configured to determine the gas pressure depending on the height of the passenger and/or the weight of the passenger. For example, the detection unit can be formed as a camera or seat occupancy sensor and can determine the height and/or the weight.

It is furthermore advantageous if the electronic computing device is configured to adjust the gas pressure in the airbag additionally depending on the impact intensity.

It is likewise advantageous if the further drain valve has at least three opening positions, a first opening position being completely open, a second opening position being a partial opening, and a third opening position describing a closed state, and one of the opening positions being actuated in the event of the impact depending on a control signal of the electronic computing unit.

It is furthermore advantageous if, to generate the at least three opening positions, the further drain valve has at least one cover, which is moved depending on the control signal.

A further aspect of the invention relates to a method for operating a side airbag device for a motor vehicle, in which, in the event of an impact, an airbag of the side airbag device is filled with a gas by means of a gas generator of the side airbag device, and in which the gas is removed immediately after the impact by means of a drain valve. It is provided that the side airbag device comprises an electronic computing unit and a further drain valve and/or a further gas generator, a passenger of the motor vehicle being detected by means of a detection unit of the side airbag device, the side airbag device being filled with the gas in the event of the impact in order to protect this passenger, and the electronic computing unit, depending on the detected person, determining a gas pressure in the airbag by actuating the further drain valve of the further gas generator prior to the impact, and adapting the gas pressure to a passenger during the impact.

Yet a further aspect of the invention relates to a motor vehicle comprising a side airbag device. The motor vehicle is in particular formed as a passenger car.

Advantageous embodiments of the side airbag device are considered to be advantageous embodiments of the motor vehicle and of the method. The side airbag device and the motor vehicle to this end have device and vehicle features that allow the method to be carried out and an advantageous embodiment thereof.

Further advantages, features and details of the invention will become clear from the following description of a preferred exemplary embodiment and with reference to the drawing. The features and combinations of features stated above in the description and also the features and combinations of features stated hereinafter in the FIGURE description and/or shown alone in the sole FIGURE, are usable not only in the combination described in each case, but also in other combinations or in isolation, without departing from the scope of the invention.

BRIEF DESCRIPTION OF THE SOLE DRAWING FIGURE

Here, the sole FIGURE shows a schematic view of a motor vehicle with an embodiment of a side airbag device.

In the sole FIGURE like or functionally like elements are provided with the same reference signs.

DETAILED DESCRIPTION

The sole FIGURE shows, in a schematic view, a motor vehicle 10 with a side airbag device 12. The side airbag device 12 comprises an airbag 14, in which, in the event of an impact, a gas is introduced by means of a gas generator 16 of the side airbag device 12, and has a drain valve 18, 20, in the present case in particular two drain valves 18, 20, for removing the gas immediately following the impact.

The side airbag device 12 comprises an electronic computing unit 22 and a further drain valve 24 and/or a further gas generator, a passenger 28 of the motor vehicle 10 being detected by means of a detection unit 26 of the side airbag device 12, the side airbag device 12 being filled with the gas in the event of the impact in order to protect this passenger 28, and the electronic computing unit 22 being configured, depending on the detected passenger 28, to determine a gas pressure in the airbag 14 by actuation of the further drain valve 24 and/or the further gas generator prior to the impact and to adapt the gas pressure to the passenger 28 during the impact.

It can further be provided that the electronic computing unit 22 is configured to determine the gas pressure depending on the height of the passenger 28 and/or the weight of the passenger 28. The electronic computing unit 22 can also be configured to adjust the gas pressure in the airbag 14 additionally depending on the impact intensity.

Furthermore, the further drain valve 24 can have at least three opening positions, a first opening position being completely open, a second opening position being a partial opening, and a third opening position describing a closed state, and one of the opening positions being actuated in the event of the impact depending on a control signal of the electronic computing unit 22. To generate the at least three opening positions, the further drain valve 24 has at least one cover, which is moved depending on the control signal.

On the whole, it is thus proposed that a gas pressure setting is determined already before the impact and is adjusted depending on the height and/or the weight of the passenger 28 or other people, such that, in the event of the impact, it is already known what gas pressure can be set in the side airbag, also depending on the impact intensity. This is performed in particular with the further drain valve 24 and/or a two-stage and/or a second gas generator.

The further drain valve 24, which in particular can also be referred to as an adaptive valve, can then be closed, partially opened, or fully opened, accordingly, when triggered. This can be achieved for example by covers, which are moved back and forth accordingly, or further valve devices.

In the alternatives of the gas generator, the further drain valve 24 is then replaced or supplemented, so that the initial pressure is also adjustable already by the gas generator and this can then likewise be drained for example by the adaptive valve.

In particular, the further drain valve 24 represents a further additional valve in order to adjust the pressure, the drain valves 18, 20 in the side airbag serving functionally furthermore for draining the airbag.

The side airbag device 12 thus comprises the adaptive valve, which in particular is actuatable and thus adjustable. Alternatively, or additionally, the side airbag device 12 comprises a second gas generator or a two-stage gas generator, so that an initial pressure level can be set.

On the whole, the invention presents a side airbag with adaptive pressure control.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 motor vehicle
12 side airbag device
14 airbag
16 gas generator
18 drain valve
20 drain valve
22 electronic computing unit
24 further drain valve
26 detection unit
28 passenger

The invention claimed is:

1. A side airbag device for a motor vehicle, the side airbag device comprising:
a gas generator;
an airbag fluidically coupled to the gas generator so that, in event of an impact, a gas is introducible into the airbag by the gas generator, wherein the airbag includes a drain valve configured to remove the gas immediately after the impact;
an electronic computing unit;
a further drain valve; and a detection unit configured to detect a passenger of the motor vehicle, wherein the side airbag device is filled with the gas in the event of the impact in order to protect this passenger, and wherein the electronic computing unit is configured, depending on the detected passenger, to determine a gas pressure in the airbag due to actuation of the further drain valve before the impact and to adapt the gas pressure to the passengers during the impact, and wherein the further drain valve is configured with at least three opening positions, a first opening position in which the airbag is completely open, a second opening position in which the airbag is partially open, and a third opening position in which the airbag is in a closed state, wherein one of the opening positions is actuated in the event of the impact depending on a control signal of the electronic computing unit.

2. The side airbag device of claim 1, wherein the electronic computing unit is further configured to determine the gas pressure depending on a height or weight of the passenger.

3. The side airbag device of claim 1, wherein the electronic computing device is further configured to adjust the gas pressure in the airbag also depending on an impact intensity.

4. The side airbag device of claim 1, wherein, to generate the at least three opening positions, the further drain valve has at least one cover, which is movable depending on the control signal.

5. A method for operating a side airbag device for a motor vehicle, the method comprising:

introducing, in event of an impact, a gas into an airbag of the side airbag device by a gas generator of the side airbag device;

draining the gas immediately after the impact via a drain valve;

detecting a passenger of the motor vehicle;

determining, depending on the detected passenger, a gas pressure in the airbag due to actuation of a further drain valve prior to the impact; and adapting the gas pressure to the passengers during the impact based on the determined gas pressure, wherein the further drain valve is configured with at least three opening positions, a first opening position in which the airbag is completely open, a second opening position in which the airbag is partially open, and a third opening position in which the airbag is in a closed state, wherein one of the opening positions is actuated in the event of the impact depending on a control signal of the electronic computing unit.

6. The method of claim 5, further comprising:

determining, by the electronic computing unit, the gas pressure depending on a height or weight of the passenger.

7. The method of claim 5, wherein the electronic computing device adjusts the gas pressure in the airbag also depending on an impact intensity.

8. The method of claim 5, wherein, to generate the at least three opening positions, the further drain valve has at least one cover, which is movable depending on the control signal.

* * * * *